(12) United States Patent
Kosaka

(10) Patent No.: US 9,426,312 B2
(45) Date of Patent: Aug. 23, 2016

(54) MANAGEMENT APPARATUS IMPLEMENTING CANCELLATION CONDITION, INFORMATION PROCESSING APPARATUS, DISTRIBUTION APPARATUS, MANAGEMENT SYSTEM, MANAGEMENT METHOD, AND NON-TRANSITORY COMPUTER READABLE MEDIUM

(71) Applicant: FUJI XEROX Co., Ltd., Minato-ku, Tokyo (JP)

(72) Inventor: Fumi Kosaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/471,916

(22) Filed: Aug. 28, 2014

(65) Prior Publication Data

US 2015/0146230 A1 May 28, 2015

(30) Foreign Application Priority Data

Nov. 28, 2013 (JP) .................................. 2013-246657

(51) Int. Cl.
*H04N 1/00* (2006.01)

(52) U.S. Cl.
CPC ........ *H04N 1/00071* (2013.01); *H04N 1/0005* (2013.01); *H04N 1/00013* (2013.01); *H04N 1/00061* (2013.01); *H04N 1/00209* (2013.01); *H04N 1/00347* (2013.01); *H04N 1/00954* (2013.01); *H04N 2201/0081* (2013.01)

(58) Field of Classification Search
CPC ........... H04N 1/00071; H04N 1/0005; H04N 1/00209; H04N 1/00347; H04N 1/00013; H04N 1/00061; H04N 2201/0081
See application file for complete search history.

(56) References Cited

U.S. PATENT DOCUMENTS

| 2009/0019187 A1* | 1/2009 | Okuma | ................. H04L 67/327 710/9 |
| 2009/0051962 A1* | 2/2009 | Asai | ...................... G06F 3/1205 358/1.15 |

FOREIGN PATENT DOCUMENTS

JP   2008-193217 A   8/2008

\* cited by examiner

*Primary Examiner* — Andrew H Lam
(74) *Attorney, Agent, or Firm* — Sughrue Mion, PLLC

(57) ABSTRACT

A management apparatus includes a device-information acquiring unit that acquires device identification information for identifying a user-designated device from multiple devices; a processing-status-information acquiring unit that acquires processing status information of each device; a commanded-processing-information acquiring unit that acquires commanded processing information related to a content of processing to be commanded to the designated device; a commanding unit that gives a command to the designated device based on the commanded processing information so as to set the designated device in an occupied state; a cancellation-condition-information acquiring unit that acquires cancellation condition information indicating a condition for cancelling the occupied state; and a cancellation-condition determining unit that determines whether the acquired processing status information satisfies the acquired cancellation condition. The commanding unit further gives a command for cancelling the occupied state in accordance with a determination result obtained by the determining unit.

18 Claims, 10 Drawing Sheets

FIG. 4

| DEVICE ID | PROCESSING STATUS INFORMATION |
|---|---|
| D101 | 0 |
| D102 | 4 |
| D103 | 5 |
| D104 | 0 |
| ⋮ | |

FIG. 5

| JOB NUMBER | USER ID | DESIGNATED DEVICE ID | COMMANDED PROCESSING INFORMATION | CANCELLATION CONDITION INFORMATION |
|---|---|---|---|---|
| 1 | U101 | D101 | S | 5 |
| 2 | U102 | D102 | C | 3 |
| 3 | U103 | D103 | S | 5 |
| 4 | U104 | D102 | C | 6 |
| | ⋮ | | | |

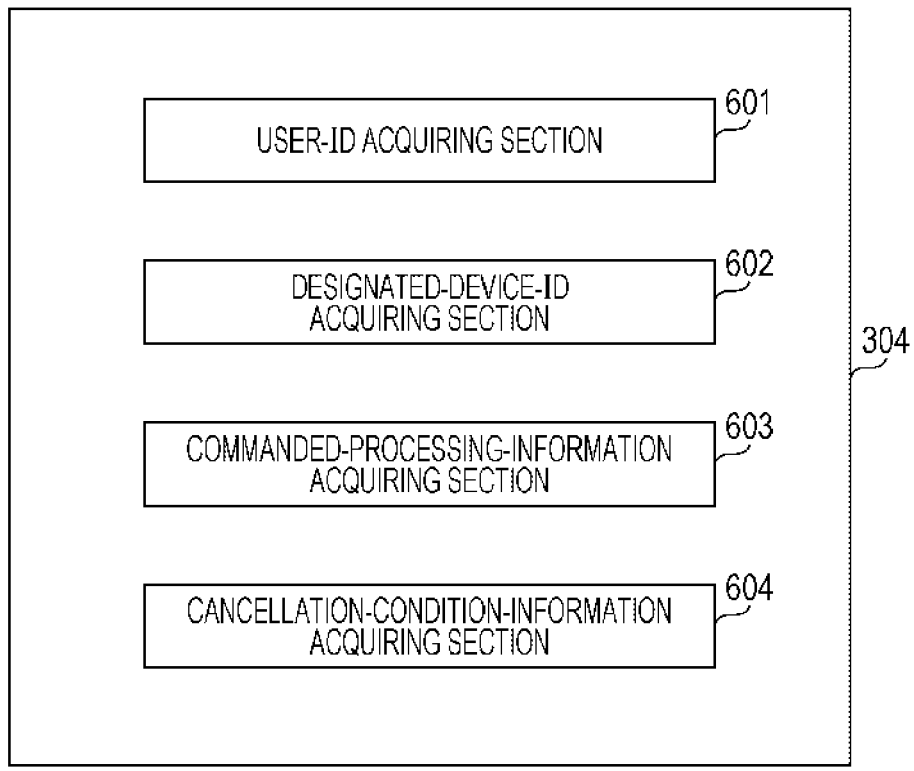

MANAGEMENT APPARATUS IMPLEMENTING CANCELLATION CONDITION, INFORMATION PROCESSING APPARATUS, DISTRIBUTION APPARATUS, MANAGEMENT SYSTEM, MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-246657 filed Nov. 28, 2013.

BACKGROUND

Technical Field

The present invention relates to management apparatuses, information processing apparatuses, distribution apparatuses, management systems, management methods, and non-transitory computer readable media.

SUMMARY

According to an aspect of the invention, there is provided a management apparatus including a device-information acquiring unit, a processing-status-information acquiring unit, a commanded-processing-information acquiring unit, a commanding unit, a cancellation-condition-information acquiring unit, and a cancellation-condition determining unit. The device-information acquiring unit acquires device identification information for identifying a device designated by a user from multiple devices. The processing-status-information acquiring unit acquires processing status information indicating a status of processing of each device. The commanded-processing-information acquiring unit acquires commanded processing information related to a content of processing to be commanded to the designated device. The commanding unit gives a command to the designated device based on the commanded processing information so as to set the designated device in an occupied state in which the designated device performs the processing in an occupied manner. The cancellation-condition-information acquiring unit acquires cancellation condition information indicating a cancellation condition for cancelling the occupied state. The cancellation-condition determining unit determines whether the processing status information acquired by the processing-status-information acquiring unit satisfies the cancellation condition acquired by the cancellation-condition-information acquiring unit. The commanding unit further gives a command for cancelling the occupied state of the designated device in accordance with a determination result obtained by the cancellation-condition determining unit.

BRIEF DESCRIPTION OF THE DRAWINGS

Exemplary embodiments of the present invention will be described in detail based on the following figures, wherein:

FIG. 4 illustrates an example of processing status information;

FIG. 5 illustrates an example of job information;

FIG. 6 illustrates a functional configuration of a job-information acquiring unit;

FIG. 7 illustrates an example of occupancy information;

DETAILED DESCRIPTION

Figure 1:
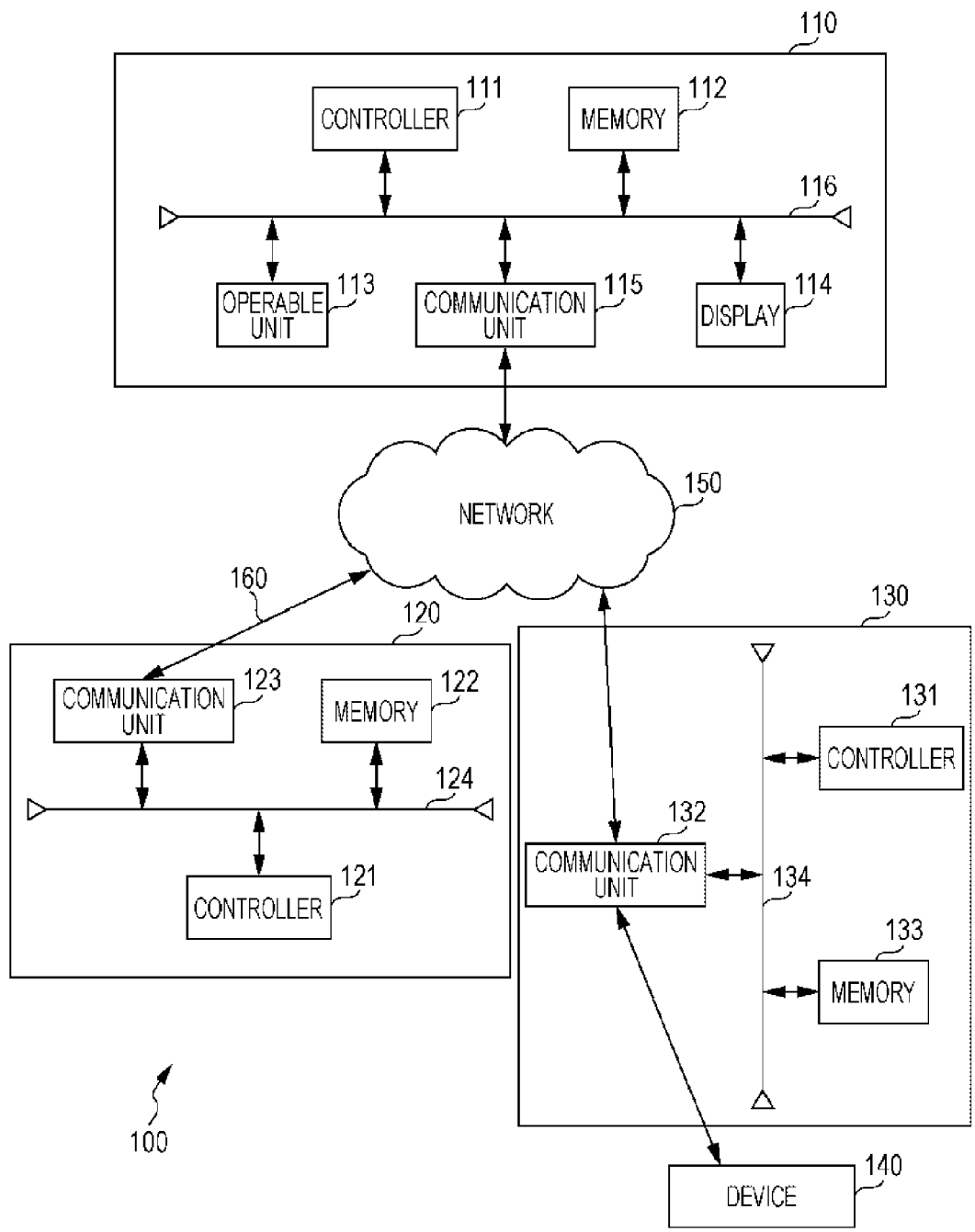
FIG. 1 schematically illustrates the configuration of a management system.

Exemplary embodiments of the present invention will be described below with reference to the drawings. In the drawings, the same or similar components are given the same reference characters, and redundant descriptions are omitted.

FIG. 1 illustrates an environment in which a management apparatus 120 according to an exemplary embodiment is used. As shown in FIG. 1, a management system 100 includes an information processing apparatus 110, the management apparatus 120, a distribution apparatus 130, a device 140, a network 150, and a local-area-network (LAN) circuit 160. The information processing apparatus 110, the management apparatus 120, and the distribution apparatus 130 are connected via the LAN circuit 160 and the network 150. The distribution apparatus 130 and the device 140 are connected via, for example, a universal-serial-bus (USB) interface. In the management system 100, the function of the distribution apparatus 130 may be included in the device 140. In that case, the function of the distribution apparatus 130, to be described later, may be a function included in the device 140. Furthermore, the device 140 is connected to the information processing apparatus 110 and the management apparatus 120 via, for example, the LAN circuit 160 and the network 150.

The information processing apparatus 110 has a function for transmitting, to the management apparatus 120, information (referred to as "job information" hereinafter) indicating the content of processing to be performed in the device 140 designated by a user. Furthermore, the information processing apparatus 110 is a user-operable computer or portable communication apparatus constituted by a server that includes a central processing unit (CPU), a memory, and so on. Moreover, the information processing apparatus 110 includes, for example, a controller 111, a memory 112, an operable unit 113, a display 114, a communication unit 115, and an internal bus 116. The controller 111, the memory 112, the operable unit 113, the display 114, and the communication unit 115 are connected to one another via the internal bus 116.

The controller 111 is, for example, a CPU or a microprocessor unit (MPU) and operates in accordance with a program stored in the memory 112. The memory 112 is constituted of, for example, an information storage medium, such as a read-only memory (ROM), a random access memory (RAM), or a hard disk, and stores the program to be executed by the controller 111. Furthermore, the memory 112 also operates as a working memory for the controller 111. The aforementioned program may be provided, for example, by being downloaded via the network 150 or by a computer-readable information storage medium, such as a compact disc read-only memory (CD-ROM) or a digital versatile disc read-only memory (DVD-ROM).

The operable unit 113 is constituted of, for example, multiple buttons or a touch-screen and outputs the content of command operation by the user to the controller 111 in accordance with the command operation. The display 114 is, for example, a liquid crystal display or an organic electroluminescence (EL) display and displays information in accordance with a command from the controller 111. The communication unit 115 allows the information processing apparatus 110 to communicate with the management apparatus 120 via the network 150.

Next, the management apparatus 120, the distribution apparatus 130, and the device 140 will be described. The management apparatus 120 is a server that manages a user ID for identifying the user and a device ID for identifying the device 140, and gives a command to the device 140 based on the job information received from the information processing apparatus 110. Specifically, for example, the management apparatus 120 is constituted by a server that includes a CPU, a memory, and so on and includes a controller 121, a memory 122, a communication unit 123, and an internal bus 124. The controller 121, the memory 122, and the communication unit 123 are connected to one another via the internal bus 124. Since the memory 122, the communication unit 123, and the internal bus 124 are similar to those described above, descriptions thereof are omitted. The controller 121 will be described in detail later.

The distribution apparatus 130, for example, receives a command from the management apparatus 120 and sends a command to the device 140 communicating with the distribution apparatus 130 in accordance with the received command. The distribution apparatus 130 includes a controller 131, a communication unit 132, a memory 133, and an internal bus 134. The controller 131, the communication unit 132, and the memory 133 are connected to one another via the internal bus 134. Since the controller 131, the communication unit 132, the memory 133, and the internal bus 134 are similar to those described above, descriptions thereof are omitted.

The device 140 is, for example, a scanner and is connected to the management apparatus 120 and the information processing apparatus 110 via the distribution apparatus 130 and the network 150. The device 140 reads information from an information medium and also transmits processing information to the management apparatus 120.

The configuration of the management system 100 shown in FIG. 1 is only an example, and various modifications are permissible. For example, the management system 100 may be realized by using the so-called cloud technology.

Figure 2:
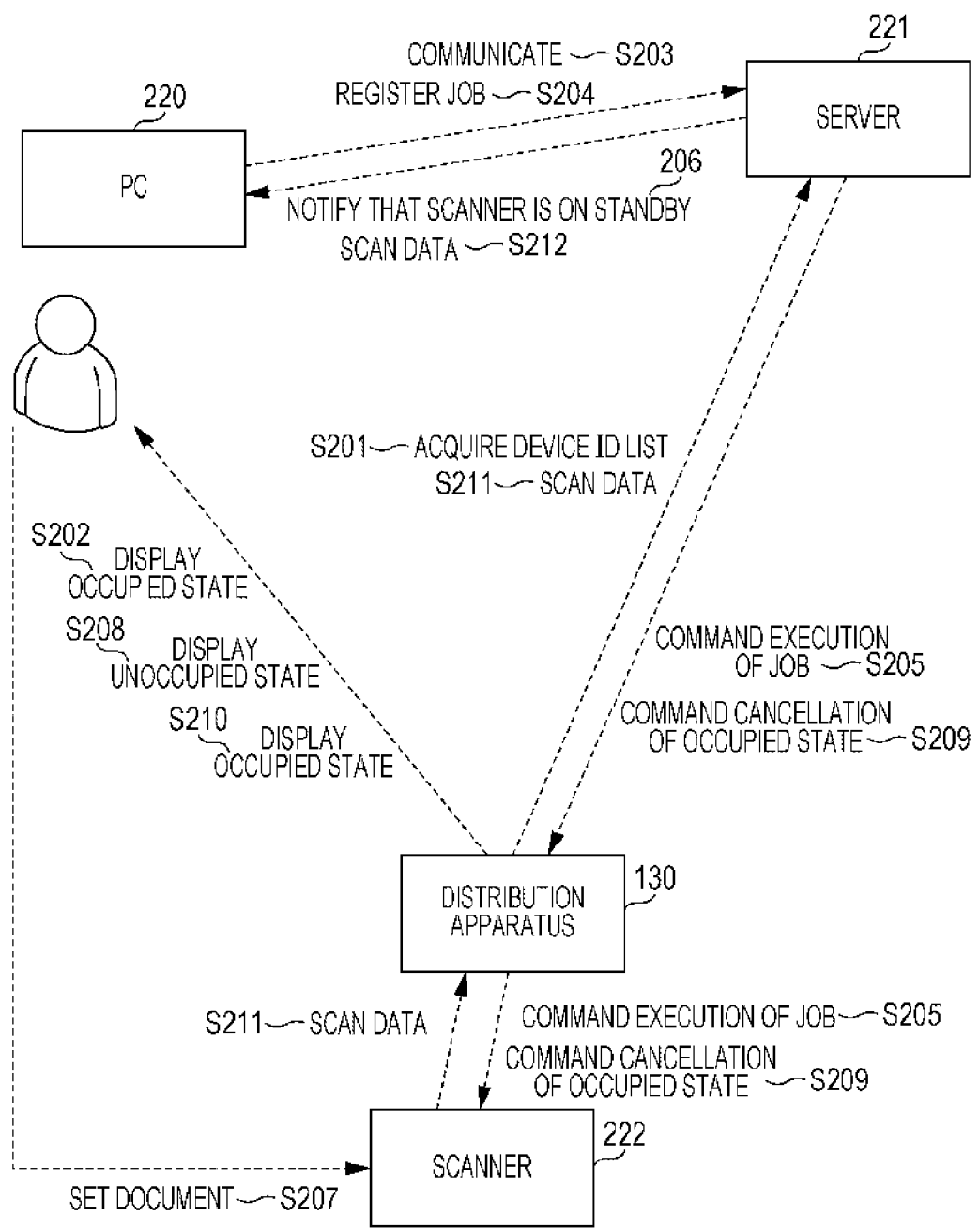
FIG. 2 schematically illustrates an example of how the management system is used.

An example of how the management system 100 is used will now be schematically described with reference to FIG. 2. As a specific example, it is assumed that, for example, the information processing apparatus 110 is a personal computer (PC) 220, the management apparatus 120 is a server 221, and the device 140 is a scanner 222. The PC 220, the server 221, and the distribution apparatus 130 are connected via the network 150, and the distribution apparatus 130 and the scanner 222 are connected via a USB interface.

First, in step S201, the server 221 acquires a list of devices 140 connected via the distribution apparatus 130. Then, in step S202, the distribution apparatus 130 notifies the user whether the connected scanner 222 is in an occupied state or unoccupied state by turning on or off a light-emitting diode (LED) lamp. Subsequently, the user confirms that the scanner 222 is in an unoccupied state based on the LED lamp of the distribution apparatus 130. Then, in step S203, the user operates the PC 220 to commence communication between the PC 220 and the server 221. In step S204, the user registers a job from the PC 220 to the server 221. Specifically, this job includes a message for commanding scanning and a condition for terminating the scanning in the scanner 222 selected from the list of devices 140. In step S205, the server 221 having acquired the job commences communication with the device 140 via the distribution apparatus 130 and commands the device 140 to execute scanning.

Subsequently, when preparation for executing scanning is completed in the scanner 222, the server 221 notifies the PC 220 in step S206 that the scanner 222 is on standby for a document to be set therein. When the user confirms that the scanner 222 is on standby, the user sets a document in the scanner 222 in step S207. Then, the scanner 222 commences scanning, and the distribution apparatus 130 notifies the user that the scanner 222 is in an occupied state by turning on the LED lamp in step S208.

For example, the server 221 acquires the processing status of the scanner 222 at regular intervals and determines whether the processing status satisfies the condition for terminating the scanning, acquired in step S204. When the server 221 determines that the processing status satisfies the condition for terminating the scanning, the server 221 commands the scanner 222 to terminate the scanning and sends a request thereto for read data in step S209. When the device 140 receives the command for terminating the scanning via the distribution apparatus 130, the distribution apparatus 130 notifies the user that the scanner 222 is in an unoccupied state by turning off the LED lamp in step S210. Then, in step S211, the scanner 222 having received the request for read data transmits the read data to the server 221 via the distribution apparatus 130. Subsequently, in step S212, the server 221 transmits the read data acquired from the device 140 to the PC 220. The above example of how the management system 100 is used is only an example and is not limited to the above.

Figure 3:
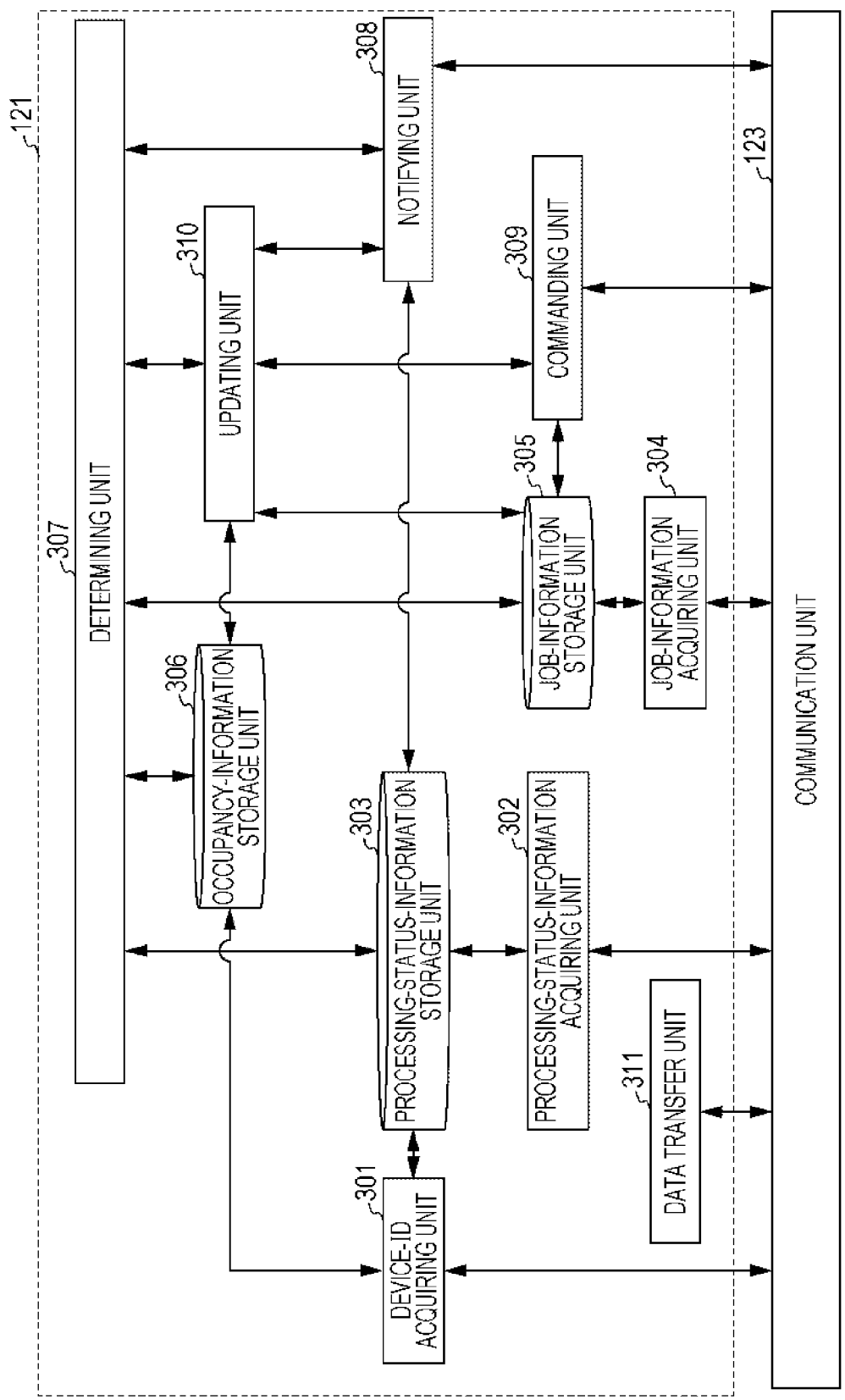
FIG. 3 illustrates a functional configuration of a management apparatus.

Next, an example of a configuration for realizing the above example of use will be described. FIG. 3 illustrates a detailed configuration of the controller 121 included in the management apparatus 120 according to an exemplary embodiment of the present invention. As shown in FIG. 3, the management apparatus 120 functionally has a device-ID acquiring unit 301, a processing-status-information acquiring unit 302, a processing-status-information storage unit 303, a job-information acquiring unit 304, a job-information storage unit 305, an occupancy-information storage unit 306, a determining unit 307, a notifying unit 308, a commanding unit 309, an updating unit 310, and a data transfer unit 311.

The device-ID acquiring unit 301 acquires a device ID for identifying each device 140 connected to the management apparatus 120. Specifically, for example, if the management apparatus 120 is connected to devices 140 indicated by device IDs D101 to D104, the device-ID acquiring unit 301 acquires the device IDs D101 to D104.

The processing-status-information acquiring unit 302 acquires processing status information indicating the status of processing executed by each device 140 indicated by the corresponding device ID acquired by the device-ID acquiring unit 301. Specifically, as shown in FIG. 4, for example, the processing-status-information acquiring unit 302 acquires processing status information indicating that the device 140 indicated by the device ID D101 is not performing any processing and is expressed as 0, the device 140 indicated by the device ID D102 has performed scanning, copying, or the like on 4 sheets, the device 140 indicated by the device ID D103 has performed scanning, copying, or the like on 5 sheets, and the device 140 indicated by the device ID D104 is not performing any processing and is expressed as 0. The processing-status-information acquiring unit 302 may acquire the processing status information at regular intervals or may acquire the processing status information at a timing at which the processing status information may be necessary.

The processing-status-information storage unit 303 stores the processing status information acquired by the processing-status-information acquiring unit 302 in association with each device ID acquired by the device-ID acquiring unit 301. Specifically, for example, if the processing-status-information storage unit 303 acquires the processing status information as described above, the processing-status-information storage unit 303 stores the processing status information as shown in FIG. 4. The processing-status-information storage unit 303 may alternatively be provided outside the management apparatus 120.

The job-information acquiring unit 304 acquires, from the information processing apparatus 110, for example, job information set in association with a user ID, a designated device ID, commanded processing information, and cancellation condition information, as shown in FIG. 5. For example, as shown in FIG. 6, the job-information acquiring unit 304 has a user-ID acquiring section 601, a designated-device-ID acquiring section 602, a commanded-processing-information acquiring section 603, and a cancellation-condition-information acquiring section 604. The job-information acquiring unit 304 will be described in detail in the description of each section.

The user-ID acquiring section 601 acquires a user ID for identifying a user. For example, the user-ID acquiring section 601 acquires a user ID input to the information processing apparatus 110 by a user via the operable unit 113 of the information processing apparatus 110. Specifically, for example, the user-ID acquiring section 601 acquires user IDs U101 to U104, as shown in FIG. 5.

The designated-device-ID acquiring section 602 acquires the device ID of each device 140 that is made to execute processing by the corresponding user. Specifically, for example, as shown in FIG. 5, the designated-device-ID acquiring section 602 acquires the device IDs D101, D102, D103, and D102 designated by the users indicated by the user IDs U101 to U104, respectively.

The commanded-processing-information acquiring section 603 acquires commanded processing information indicating the content of processing to be executed by each device 140. Specifically, for example, as shown in the second row in FIG. 5, the commanded-processing-information acquiring section 603 acquires commanded processing information (shown as "S" in FIG. 5) for making the device 140 indicated by D101 execute scanning. Furthermore, for example, as shown in the third row in FIG. 5, the commanded-processing-information acquiring section 603 acquires commanded processing information (shown as "C" in FIG. 5) for making the device 140 indicated by D102 execute copying.

The cancellation-condition-information acquiring section 604 acquires cancellation condition information indicating a condition for cancelling an occupied state of a device 140. An occupied state in this case is a state where the management apparatus 120 has commanded the device 140 to execute processing indicated by the commanded processing information based on the job information and extends until the processing executing state is cancelled. In other words, the commanding unit 309, to be described later, does not give a command based on another job information to a device 140 in an occupied state.

Specifically, for example, as shown in the second row in FIG. 5, the cancellation-condition-information acquiring section 604 acquires cancellation condition information of "5". In this case, the cancellation condition information of "5" in the second row in FIG. 5 indicates that, since the designated device ID in the same second row in FIG. 5 is D101 and the commanded processing information is "S", the occupied state of the designated device 140 indicated by the device ID D101 is cancelled after the device 140 performs scanning on 5 sheets.

The job-information storage unit 305 stores each piece of job information acquired by the job-information acquiring unit 304 and a job number set in association with each piece of job information. For example, the job-information storage unit 305 stores the job information acquired by the job-information acquiring unit 304 in association with a job number with a numerical value that is larger by one than a numerical value indicating the largest number among job numbers contained in the job information. The job-information storage unit 305 may alternatively be provided outside the management apparatus 120.

Specifically, for example, as shown in the second row in FIG. 5, the job-information storage unit 305 stores the user ID U101, the device ID D101, the commanded processing information of "S", and the cancellation condition information of "5" in association with the job number "1". In this case, the job information with the job number "1" has information for cancelling the job executing state when the device 140 indicated by the device ID D101 is made to execute scanning by the user indicated by the user ID U101 and finishes performing the scanning on 5 sheets.

The occupancy-information storage unit 306 stores information indicating whether each device 140 indicated by the corresponding device ID acquired by the device-ID acquiring unit 301 is in an occupied state or an unoccupied state. For example, when the commanding unit 309 to be described later commands the device 140 to execute processing based on job information, the occupancy-information storage unit 306 stores a user ID contained in the job information. Furthermore, for example, when the commanding unit 309 gives a command for cancelling the occupied state of the device 140, the occupancy-information storage unit 306 stores information indicating an unoccupied state. Specifically, for example, as shown in FIG. 7, the devices 140 indicated by the device IDs D101 and D104 are in an unoccupied state, whereas the devices 140 indicated by the device IDs D102 and D103 are in an occupied state based on job information commanded by the users indicated by the user IDs U101 and U102. The occupancy-information storage unit 306 may alternatively be provided outside the management apparatus 120.

Figure 8:
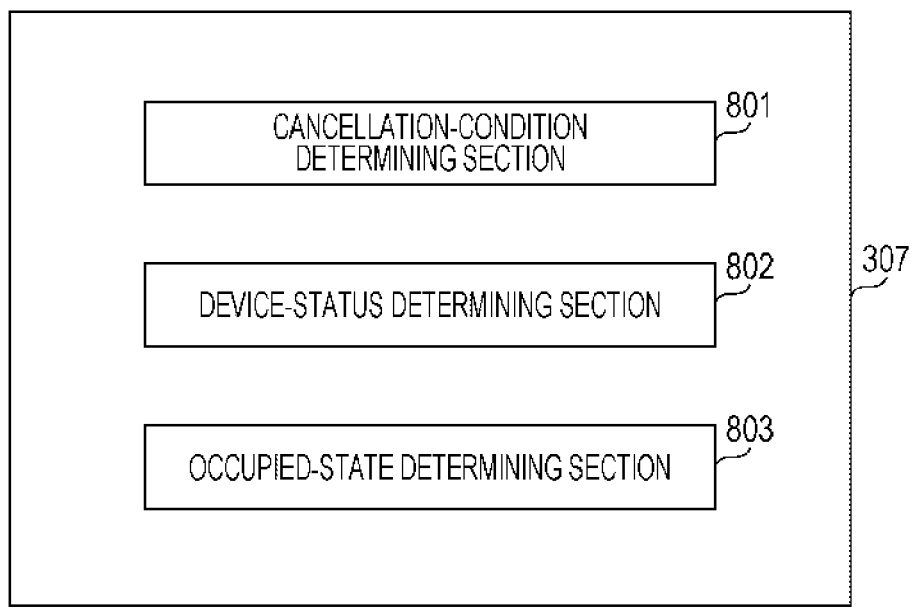
FIG. 8 illustrates a functional configuration of a determining unit.

Referring to FIG. 8, the determining unit 307 functionally has, for example, a cancellation-condition determining section 801, a device-status determining section 802, and an occupied-state determining section 803.

The cancellation-condition determining section 801 determines whether processing status information stored in the processing-status-information storage unit 303 satisfies cancellation condition information contained in job information. Specifically, for example, the following description relates to a case where the job-information acquiring unit 304 acquires the job information with the job number "3" shown in the fourth row in FIG. 5, and the processing-status-information storage unit 303 stores the processing status information shown in FIG. 4. In this case, the job information with the job number "3" contains the device ID D103, and the processing-status-information storage unit 303 stores processing status information of "5" set in association with D103. Since the job information with the job number "3" contains cancellation condition information of "5", the cancellation-condition determining section 801 determines that the processing status information and the cancellation condition information match since they are both "5".

If the processing status information and the cancellation condition information do not match, the cancellation-condition determining section 801 determines whether the processing status information is larger than or smaller than the cancellation condition information. In the above description, the magnitude relationship, which is determined by the cancellation-condition determining section 801, between the processing status information and the cancellation condition information includes three cases, namely, a case where the processing status information and the cancellation condition information match, a case where the processing status information is larger than the cancellation condition information, and a case where the processing status information is smaller than the cancellation condition information. Alternatively, the magnitude relationship determined by the cancellation-condition determining section 801 may include two cases, namely, a case where the processing status information is smaller than the cancellation condition information and a case where the processing status information is not smaller than the cancellation condition information.

The device-status determining section 802 determines whether processing based on job information has stopped in each device 140. For example, the management apparatus 120 has a timer (not shown) that measures time, and if the processing status information stored in the processing-status-information storage unit 303 is not updated before or after the time measured by the timer reaches a preset time, the device-status determining section 802 determines that the device 140 has stopped performing the processing based on the job information.

Furthermore, for example, each device 140 may have a sensor (not shown) that detects that processing based on a command from the commanding unit 309 has stopped. When the sensor detects that the processing in the device 140 has stopped, the device-status determining section 802 may determine that the device 140 has stopped performing the processing based on the job information. In this case, the device 140 acquires, from the device-status determining section 802, stoppage information indicating that the device 140 has stopped performing the processing.

Specifically, for example, the following description relates to a case where the device 140 is a scanner 222 equipped with a duplex automatic document feeder (DADF), and the commanded processing information contained in the job information indicates scanning. In this case, the scanner 222 is unable to execute scanning unless a document is set in the feeding device. The device-status determining section 802 acquires a stoppage signal from the device 140 and determines that the device 140 is unable to execute the processing based on the job information.

The occupied-state determining section 803 compares a designated device ID contained in job information with occupancy information stored in the occupancy-information storage unit 306 and determines whether the device 140 indicated by the designated device ID is in an occupied state or an unoccupied state. Specifically, for example, the following description relates to a case where the job-information acquiring unit 304 acquires the job information with the job number "1" in the second row in FIG. 5, and the occupancy-information storage unit 306 stores each piece of occupancy information shown in FIG. 7. In this case, since the job information with the job number "1" contains the designated device ID D101 and the occupancy-information storage unit 306 stores occupancy information indicating an unoccupied state set in association with D101, the occupied-state determining section 803 determines that the device 140 is in an unoccupied state.

Figure 9:
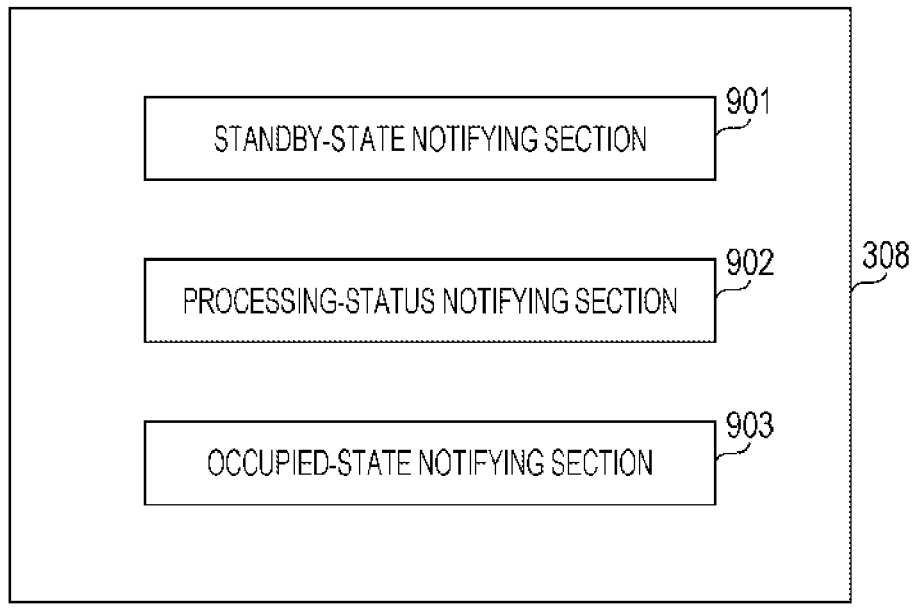
FIG. 9 illustrates a functional configuration of a notifying unit.

Referring to FIG. 9, the notifying unit 308 functionally has, for example, a standby-state notifying section 901, a processing-status notifying section 902, and an occupied-state notifying section 903.

The standby-state notifying section 901 notifies the information processing apparatus 110 that a designated device 140 is in a standby state including a condition for executing processing indicated by commanded processing information. Specifically, for example, if the device 140 is a scanner and a document is not set in a DADF included in the scanner, the standby-state notifying section 901 provides a notification to the information processing apparatus 110 of the user indicated by the corresponding user ID that the scanner is on standby for scanning until a document is set in the DADF.

The processing-status notifying section 902 provides a notification regarding processing status information of a device 140 in association with a job number stored in the job-information storage unit 305 and that the device 140 has interrupted the processing to the information processing apparatus 110 of the user indicated by the corresponding user ID. For example, if the cancellation-condition determining section 801 determines that the processing status information is smaller than the cancellation condition information and the device 140 has interrupted the processing, or if the cancellation-condition determining section 801 determines that the processing status information is larger than the cancellation condition information, the processing-status notifying section 902 provides a notification regarding the processing status information of the device 140 and that the device 140 has interrupted the processing.

Specifically, for example, the following description relates to a case where the job-information acquiring unit 304 acquires the job information with the job number "2" in the third row in FIG. 5, and the processing-status-information storage unit 303 stores the processing status information shown in FIG. 4. In this case, the job information with the job number "2" contains the designated device ID D102, and the cancellation condition information is "3". Furthermore, since the processing status information set in association with the device ID D102 contained in the processing status information is "4", the cancellation-condition determining section 801 determines that the processing status information is larger than the cancellation condition information. Therefore, the processing-status notifying section 902 provides a notification regarding the processing status information of "4" and that the device 140 has interrupted the processing to the information processing apparatus 110 of the user indicated by the user ID U102 contained in the job information.

The occupied-state notifying section 903 provides a notification to the information processing apparatus 110 of the user indicated by the corresponding user ID that a designated device 140 is in an occupied state or an unoccupied state. Specifically, for example, the occupied-state notifying section 903 causes the display 114 included in the information processing apparatus 110 to display the occupied state of the designated device 140. The management apparatus 120, the distribution apparatus 130, or each device 140 may have an LED lamp or a display, such as a liquid crystal display. The occupied-state notifying section 903 may provide the notification of the occupied state by turning on or off the LED lamp or by displaying an occupied-state message on the liquid crystal display.

The commanding unit 309 commands each device 140 to execute processing indicated by commanded processing information and to cancel an occupied state in which the processing is executed. Specifically, for example, if the job-information acquiring unit 304 acquires the job information with the job number "1" in the second row in FIG. 5, the commanding unit 309 commands the device 140 indicated by the device ID D101 to execute scanning. Then, when the device 140 indicated by the device ID D101 satisfies the cancellation condition information after executing scanning on 5 sheets, the occupied state is cancelled.

Figure 10:
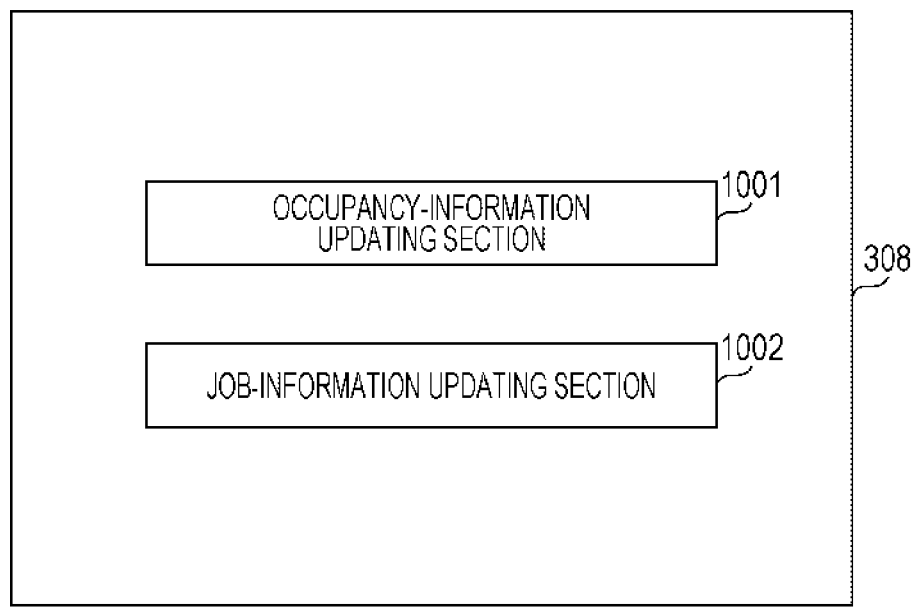
FIG. 10 illustrates a functional configuration of an updating unit.

Referring to FIG. 10, the updating unit 310 functionally has, for example, an occupancy-information updating section 1001 and a job-information updating section 1002.

The occupancy-information updating section 1001 updates occupancy information stored in the occupancy-information storage unit 306 based on a command given to each device 140 by the commanding unit 309. For example, before the commanding unit 309 commands the device 140 to execute processing based on job information, the occupancy-information updating section 1001 updates the occupancy information set in association with the device ID indicating the device 140 to the user ID contained in the job information. Furthermore, before the commanding unit 309 commands the device 140 to cancel the processing based on the job information, the occupancy-information updating section 1001 updates the occupancy information set in association with the device ID indicating the device 140 to an unoccupied state.

Specifically, for example, the following description relates to a case where the job-information acquiring unit 304 acquires the job information shown in the second row in FIG. 5 in a state where the occupancy-information storage unit 306 stores each piece of occupancy information shown in FIG. 7. In this case, the job information shown in the second row in FIG. 5 contains the device ID D101, and the occupancy information set in association with D101 indicates an unoccupied state as shown in FIG. 7. Therefore, since the commanding unit 309 commands the device 140 indicated by D101 to execute processing based on the job information, the occupancy-information updating section 1001 updates the occupancy information set in association with D101 to the user ID U101 contained in the job information.

Based on the command given to the device 140 by the commanding unit 309, the job-information updating section 1002 updates the job information stored in the job-information storage unit 305. For example, if the commanding unit 309 commands the device 140 to cancel the occupied state thereof, the job-information updating section 1002 deletes the job information corresponding to the command for cancelling the occupied state of the device 140 and moves up a job number contained in another job information stored in the job-information storage unit 305 so as to update the job information stored in the job-information storage unit 305.

Specifically, for example, the following description relates to a case where the commanding unit 309 gives a command for stopping the job of the job number "1" in a state where the job-information storage unit 305 stores the job information shown in FIG. 5. In this case, the job-information updating section 1002 deletes the job information containing the job number "1" and updates the job numbers "2" to "4" contained in the other job information to job numbers "1" to "3", respectively.

The data transfer unit 311 acquires data acquired by each device 140 based on job information and transfers the data to the information processing apparatus 110 of the user indicated by the corresponding user ID contained in the job information. Although not shown, the data transfer unit 311 functionally has, for example, a data transmission commanding section, a data acquiring section, a data storage section, and a data transmitting section.

Specifically, for example, the following description relates to a case where the device 140 is a scanner 222. In this case, the data transmission commanding section commands the scanner 222 to transmit read data. Then, the data acquiring section acquires the data read by the scanner 222. Subsequently, the data storage section stores the data acquired by the data acquiring section. Then, the data transmitting section transmits the data stored in the data storage section to the information processing apparatus 110 of the user indicated by the corresponding user ID contained in the job information. The management apparatus 120 may alternatively be configured not to have the data transfer unit 311. For example, if the device 140 is a copier, the data transfer unit 311 does not acquire data from the copier after the copier finishes a job including commanded processing information indicating copying. Therefore, the management apparatus 120 may be configured not to have the data transfer unit 311.

In FIG. 3, the functions of the device-ID acquiring unit 301 to the updating unit 310 are provided in the controller 121 included in the management apparatus 120. Alternatively, the aforementioned functions may be provided in the controller 111 included in the information processing apparatus 110 or may be provided in the controller 131 included in the distribution apparatus 130.

Figure 11:
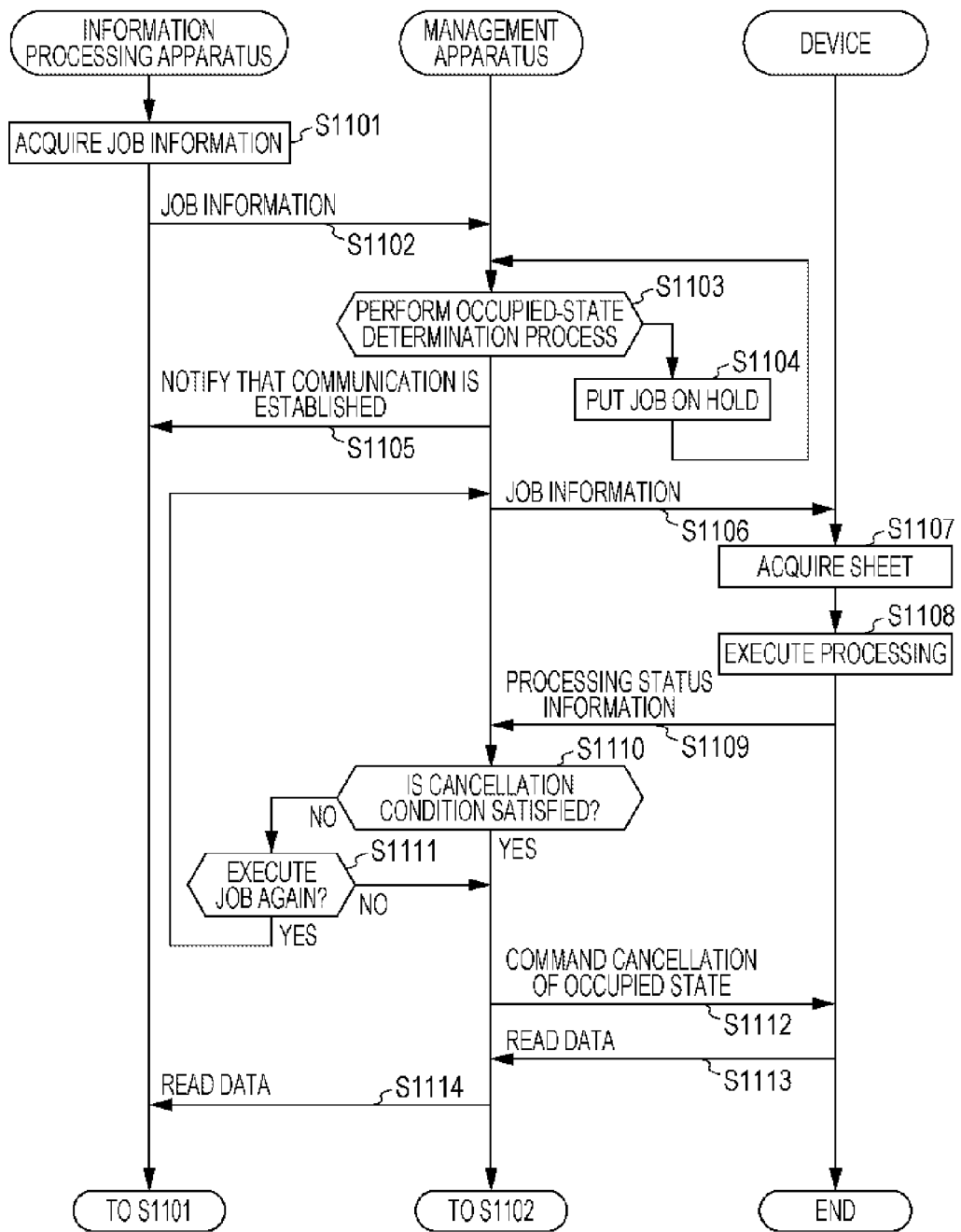
FIG. 11 illustrates the flow of process performed in the management system.

FIG. 11 schematically illustrates the flow of process performed by the information processing apparatus 110, the management apparatus 120, and the device 140, in accordance with an exemplary embodiment of the present invention. The flow to be described below is only an example, and the exemplary embodiment is not limited thereto. Furthermore, in the following description, it is assumed that a user uses the management system 100 for making the scanner 222 equipped with DADF execute scanning. Moreover, the following description relates to a case where, for example, the user sets a document in the DADF after the information processing apparatus 110 acquires a notification from the standby-state notifying section 901 that the device 140 is on standby.

First, in step S1101, the information processing apparatus 110 acquires job information. Specifically, for example, the information processing apparatus 110 acquires the job information with the job number "1" shown in the second row in FIG. 5. Then, in step S1102, the management apparatus 120 acquires the job information acquired by the information processing apparatus 110.

In step S1103, the occupied-state determining section 803 included in the management apparatus 120 compares a designated device ID contained in the job information with occupancy information stored in the occupancy-information storage unit 306 and determines whether the device 140 indicated by the designated device ID is in an occupied state or an unoccupied state. If the occupied-state determining section 803 determines that the device 140 is in an occupied state, the process proceeds to step S1104. If the occupied-state determining section 803 determines that the device 140 is in an unoccupied state, the process proceeds to step S1105.

If the occupied-state determining section 803 determines that the device 140 is in an occupied state, the commanding unit 309 included in the management apparatus 120 puts a job execution command given to the device 140 on hold in step S1104. After a predetermined time elapses, the occupied-state determining section 803 performs the occupied-state determination process again. If the occupied-state determining section 803 determines that the device 140 is in an unoccupied state, the process proceeds to step S1105.

When the occupied-state determining section 803 determines that the device 140 is in an unoccupied state, the standby-state notifying section 901 notifies the information processing apparatus 110 in step S1105 that communication between the management apparatus 120 and the designated device 140 is established and that the designated device 140 is on standby.

Then, in step S1106, the commanding unit 309 included in the management apparatus 120 commands the device 140 to execute processing based on commanded processing information contained in the job information. Specifically, in the above example, the scanner 222 is given a command to execute scanning. Subsequently, in step S1107, the user sets a document in the scanner 222 in accordance with the notification in step S1105.

Then, in step S1108, the device 140 executes the processing based on the commanded processing information acquired from the commanding unit 309. Specifically, in the above example, the scanner 222 scans the document set in the DADF.

In step S1109, the processing-status-information acquiring unit 302 included in the management apparatus 120 acquires processing status information of the device 140. The processing-status-information acquiring unit 302 may acquire the processing status information of the device 140 at regular intervals.

Then, in step S1110, the cancellation-condition determining section 801 included in the management apparatus 120 determines whether the processing status information stored in the processing-status-information storage unit 303 satisfies cancellation condition information contained in the job information. If the cancellation-condition determining section 801 determines that the processing status information satisfies the cancellation condition information, the process proceeds to step S1112. If the cancellation-condition determining section 801 determines that the processing status information does not satisfy the cancellation condition information, the process proceeds to step S1111.

If the cancellation-condition determining section 801 determines that the processing status information does not satisfy the cancellation condition information, the process branches off in step S1111 into a case where the job executing state is cancelled and a case where the job is executed again. This will be described in detail later. If the occupied state of the device 140 is to be cancelled, the process proceeds to step S1112. If the job is to be executed again, the process proceeds to step S1106.

If the cancellation-condition determining section 801 determines that the processing status information satisfies the cancellation condition information or if the job is not to be executed again in step S1111, the commanding unit 309 included in the management apparatus 120 gives a command to the device 140 for cancelling the occupied state thereof in step S1112.

Subsequently, in step S1113, the device 140 transmits, to the management apparatus 120, read data obtained as a result of executing the job. In step S1114, the management apparatus 120 transfers the data acquired from the device 140 to the information processing apparatus 110. Specifically, in the above example, the data transfer unit 311 included in the management apparatus 120 acquires read data read by the scanner 222 and transfers the read data to the information processing apparatus 110. The job related to the job information acquired in step S1101 ends here.

Subsequently, the process proceeds to step S1101 again where the information processing apparatus 110 acquires new job information. Then, the information processing apparatus 110 executes the series of steps S1101 to S1114 again in a manner similar to the above. After step S1114, the information processing apparatus 110 maintains a standby state until new job information is acquired.

After step S1114, step S1102 is performed again in which the management apparatus 120 acquires the new job information acquired by the information processing apparatus 110. Then, the management apparatus 120 executes the series of steps S1102 to S1114 again in a manner similar to the above. After step S1114, the management apparatus 120 maintains a standby state until new job information is acquired. Although the device 140 ends the processing after step S1113 in FIG. 11, the device 140 may maintain a standby state, like the information processing apparatus 110 and the management apparatus 120, and perform steps S1107 to S1113 again based on the job information acquired from the management apparatus 120 in step S1106.

Figure 12:
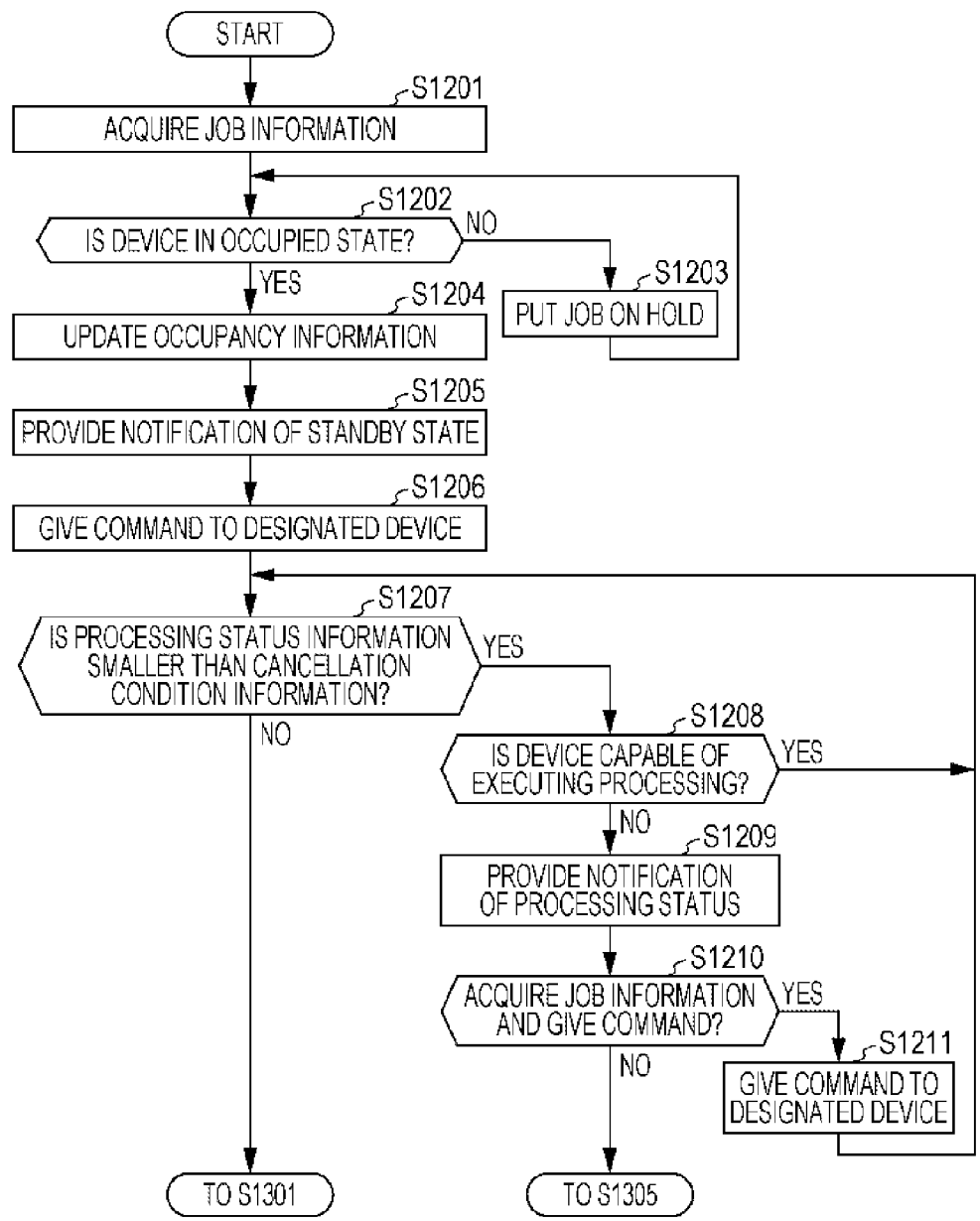
FIG. 12 illustrates the flow of process performed in the management apparatus.
Figure 13:
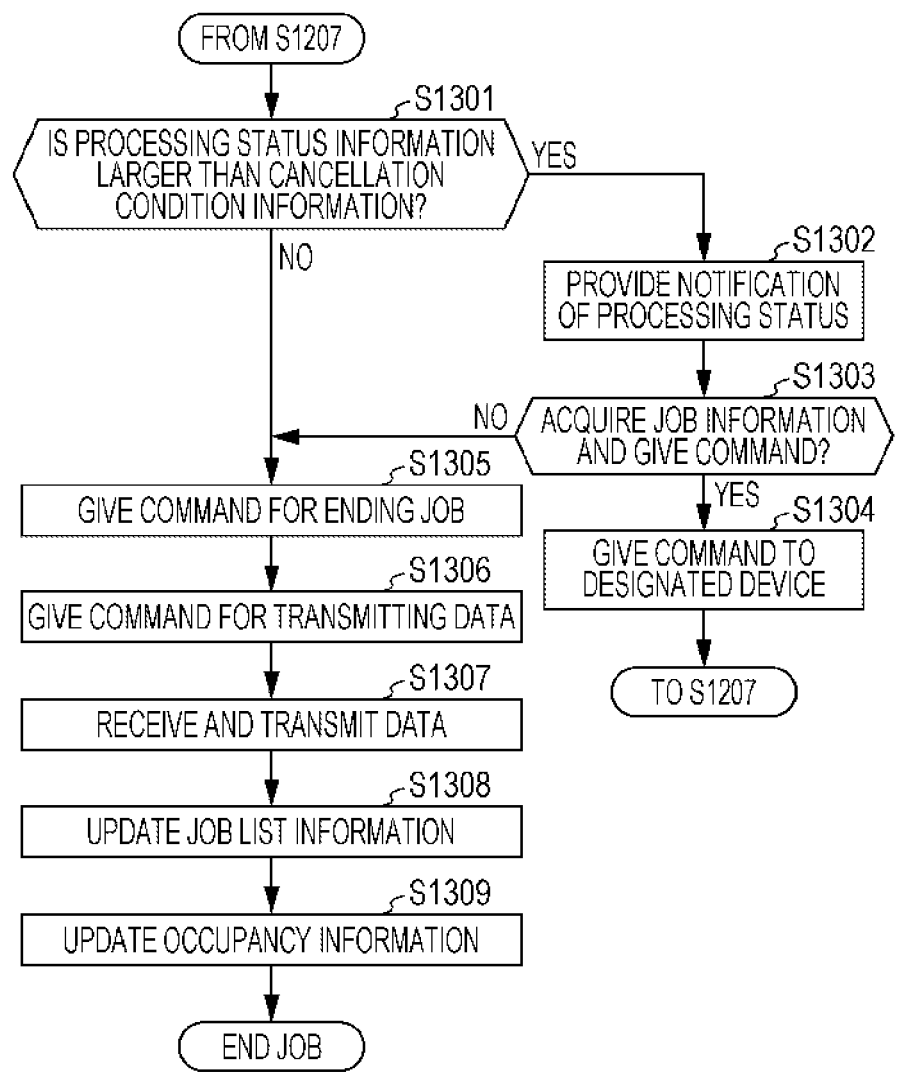
FIG. 13 illustrates the flow of process performed in the management apparatus.

FIGS. 12 and 13 illustrate the flow of process performed by the management apparatus 120 in the flow of process described above. A specific example will be described by employing an exemplary embodiment similar to the above.

First, in step S1201, the job-information acquiring unit 304 acquires job information from the information processing apparatus 110. Specifically, for example, as shown in the second row in FIG. 5, the job-information storage unit 305 acquires the job information containing the user ID U101, the device ID D101, the commanded processing information of "S", and the cancellation condition information of "5" set in association with the job number "1". The acquired job information is stored into the job-information storage unit 305 in association with the job number "1".

Then, in step S1202, the occupied-state determining section 803 compares the device ID contained in the job information with occupancy information stored in the occupancy-information storage unit 306 and determines whether the device 140 indicated by the device ID is in an occupied state or an unoccupied state. Specifically, in the above example, since the job information with the job number "1" contains the device ID D101 and the occupancy-information storage unit 306 stores occupancy information indicating an unoccupied state set in association with D101, the occupied-state determining section 803 determines that the device 140 is in an unoccupied state. If the occupied-state determining section 803 determines that the device 140 is in an occupied state, the process proceeds to step S1203. If the occupied-state determining section 803 determines that the device 140 is in an unoccupied state, the process proceeds to step S1204.

If the occupied-state determining section 803 determines that the device 140 is in an occupied state, the commanding unit 309 puts a job execution command given to the device 140 on hold in step S1203. Specifically, in the above example, since the occupied-state determining section 803 determines that the device 140 indicated by the device ID D101 is in an unoccupied state, step S1203 is not executed. For example, when a predetermined time elapses after the commanding unit 309 puts the job execution command given to the device 140 on hold, the process proceeds to step S1202.

If the occupied-state determining section 803 determines that the device 140 is in an unoccupied state, the process proceeds to step S1204 where the occupancy-information updating section 1001 updates the occupancy information stored in the occupancy-information storage unit 306 based on the command given to the device 140 by the commanding unit 309. Specifically, in the above example, the occupancy-information updating section 1001 updates the occupancy information set in association with the device ID D101 shown in the second row in FIG. 7 to U101.

Then, in step S1205, the standby-state notifying section 901 provides a notification to the information processing apparatus 110 of the user indicated by the corresponding user ID that the device 140 indicated by the designated device ID is on standby.

Subsequently, in step S1206, the commanding unit 309 commands the device 140 to execute processing indicated by the commanded processing information based on the job information. Specifically, in the above example, the commanding unit 309 commands the scanner 222 indicated by the device ID D101 to execute scanning.

Then, in step S1207, the cancellation-condition determining section 801 determines whether processing status information stored in the processing-status-information storage unit 303 is smaller than the cancellation condition information contained in the job information. As a specific example, it is assumed that the processing-status-information storage unit 303 stores the processing status information shown in FIG. 4. In this case, the processing status information set in association with the device ID D101 contained in the processing status information shown in FIG. 4 is "0", and the cancellation condition information contained in the job information with the job number "1" is "5". Therefore, the cancellation-condition determining section 801 determines that the processing status information is smaller than the cancellation condition information. When the cancellation-condition determining section 801 determines that the processing status information is smaller than the cancellation condition information, the process proceeds to step S1208. If the cancellation-condition determining section 801 determines that the processing status information is not smaller than the cancellation condition information, the process proceeds to step S1301. In the above specific example, since the cancellation-condition determining section 801 determines that the processing status information is smaller than the cancellation condition information, the process proceeds to step S1208.

Subsequently, in step S1208, the device-status determining section 802 determines whether the device 140 has stopped performing the processing based on the job information. Specifically, it is assumed that the device 140 is the scanner 222 equipped with the DADF in the above example. In this case, if a document is set in the feeding device, the device-status determining section 802 does not acquire a notification indicating that scanning is not possible, and determines that the device 140 is not on standby. On the other hand, if a document is not set in the feeding device, the device-status determining section 802 acquires a notification indicating that scanning is not possible, and determines that the device 140 is on standby. In the former case, the process proceeds to step S1207. In the latter case, the process proceeds to step S1209.

If the device-status determining section 802 determines that the device 140 is on standby, the processing-status notifying section 902 provides a notification regarding the processing status information of the device 140 and that the device 140 has interrupted the processing to the information processing apparatus 110 of the user indicated by the corresponding user ID in step S1308. Specifically, for example, it is assumed that there are zero sheets of documents set in the feeding device after the scanner 222 has performed scanning on three sheets. In this case, the processing-status notifying section 902 provides a notification to the information processing apparatus 110 of the user indicated by the corresponding user ID that scanning has been performed on "3" sheets in association with the job number "1" and that there are no documents set in the feeding device.

Then, in step S1210, the job-information acquiring unit 304 acquires job information set in association with a job number from the information processing apparatus 110. In this case, if the job-information acquiring unit 304 acquires job information and the commanding unit 309 gives a command to the device 140, the process proceeds to step S1211. If the job-information acquiring unit 304 does not acquire job information, the process proceeds to step S1305. Specifically, for example, it is assumed that the job-information acquiring unit 304 acquires updated job information containing the user ID U101, the device ID D101, the commanded processing information of "S", and the cancellation condition information of "5" set in association with the job number "1", as shown in the second row in FIG. 5. In this case, since the job-information acquiring unit 304 acquires the updated job information, the process proceeds to step S1211. A case where the job-information acquiring unit 304 does not acquire job information will be described later in step S1305.

Subsequently, in step S1211, the commanding unit 309 commands the device 140 to execute the processing indicated by the commanded processing information based on the job information. The user may additionally set a document or documents in the feeding device between step S1209 and step S1210. Specifically, for example, it is assumed that the user adds two sheets of documents in the feeding device. In the above example, the commanding unit 309 commands the device 140 indicated by the device ID D101 to execute scanning, and the scanner 222 reads document data of two added sheets. After the commanding unit 309 gives the command to the device 140 based on the job information, the process proceeds to step S1207. Then, for example, since the cancellation condition information is "5" in the above specific example, the cancellation-condition determining section 801 determines in step S1207 that the processing status information is not smaller than the cancellation condition information after the device 140 executes the processing.

Subsequently, if it is determined in step S1207 that the processing status information is not smaller than the cancellation condition information, the cancellation-condition determining section 801 determines in step S1301 whether the processing status information stored in the processing-status-information storage unit 303 is larger than the cancellation condition information contained in the job information. Specifically, for example, the following description relates to a case where the processing-status-information acquiring unit 302 acquires the processing status information until step S1301 after the two added sheets worth of document data are scanned, and the processing-status-information storage unit 303 stores the processing status information of "5" set in association with D101.

In this case, since the cancellation condition information contained in the job information is "5", the cancellation-condition determining section 801 determines that the processing status information is not larger than the cancellation condition information. If the cancellation-condition determining section 801 determines that the processing status information is larger than the cancellation condition information, the process proceeds to step S1302. If the cancellation-condition determining section 801 determines that the processing status information is not larger than the cancellation condition information, the process proceeds to step S1305. Since the cancellation-condition determining section 801 determines that the processing status information is not larger than the cancellation condition information in the above specific example, the process proceeds to step S1305.

If the cancellation-condition determining section 801 determines that the processing status information is larger than the cancellation condition information, the processing-status notifying section 902 provides a notification of the processing status information of the device 140 to the information processing apparatus 110 of the user indicated by the corresponding user ID in step S1302. Specifically, in the above example, since the cancellation-condition determining section 801 determines that the processing status information is not larger than the cancellation condition information, the processing-status notifying section 902 does not provide the notification. A specific example of steps S1302 to S1304 will be described later with reference to a modification.

Subsequently, the job-information acquiring unit 304 acquires job information set in association with a job number from the information processing apparatus 110 in step S1303. In this case, if the job-information acquiring unit 304 acquires job information and the commanding unit 309 gives a command to the device 140, the process proceeds to step S1304. If the job-information acquiring unit 304 does not acquire job information and the commanding unit 309 does not give a command, the process proceeds to step S1305. If the commanding unit 309 gives a command to the device 140, the commanding unit 309 commands the device 140 to execute the processing indicated by the commanded processing information based on the job information in step S1304. After the commanding unit 309 gives the command to the device 140 based on the job information, the process proceeds to step S1306.

If the cancellation-condition determining section 801 determines in step S1301 that the processing status information is not larger than the cancellation condition information and if the job-information acquiring unit 304 does not acquire job information in step S1210 and step S1303, the commanding unit 309 commands the device 140 to cancel the occupied state thereof in step S1305. Specifically, in the above example, the commanding unit 309 commands the scanner 222 indicated by the device ID D101 to stop scanning.

Then, in step S1306, the data transmission commanding section commands the device 140 to transmit data based on the cancellation condition information contained in the job information. Specifically, in the above example, the data transmission commanding section commands the device 140 to transmit read data of five scanned document sheets based on the cancellation condition information of "5" set in association with the job number "1".

Then, the data acquiring section acquires the data read by the scanner 222, and the data storage section temporarily stores the data acquired by the data acquiring section. Subsequently, in step S1307, the data transmitting section transmits the data stored in the data storage section to the information processing apparatus 110 of the user indicated by the user ID contained in the job information. Specifically, in the above example, the data acquiring section acquires five document sheets worth of read data read by the scanner 222 indicated by the device ID D101, and the data storage section temporarily stores the data acquired by the data acquiring section. Then, the data transmitting section transmits the data stored in the data storage section to the information processing apparatus 110 of the user indicated by the user ID U101.

Subsequently, the job-information updating section 1002 updates the job information stored in the job-information storage unit 305 based on a command given to the device 140 by the commanding unit 309. Specifically, in the above example, the job-information updating section 1002 deletes the job information with the job number "1" and updates the job numbers "2" to "4" contained in the other job information to job numbers "1" to "3", respectively.

Then, in step S1309, the occupancy-information updating section 1001 updates the occupancy information set in association with the device ID indicating the device 140 given the command for cancelling the processing in step S1308 to an unoccupied state. Specifically, in the above example, the occupancy information set in association with D101 among the multiple pieces of occupancy information shown in FIG. 7 is updated to an unoccupied state.

Modification

The exemplary embodiment described above relates to a case where the cancellation condition information is smaller than the processing status information. However, as in a modification to be described below, the cancellation condition information may be larger than the processing status information.

The following description relates to a case where the functional configuration and the flow of process according to this modification are similar to those in the above exemplary embodiment and the number of document sheets set in the feeding device is larger than the cancellation condition information. As a specific example, it is assumed that the device 140 indicated by the device ID D101 is a scanner 222 equipped with a pre-read DADF. Moreover, in the following description, it is assumed that, when documents are set in the feeding device, the scanner 222 is a device 140 that reads a subsequent document before acquiring a command for cancelling the occupied state from the management apparatus 120. Furthermore, it is assumed that, in step S1301, the job-information storage unit 305 stores the job information set in association with the job number "1" shown in the second row in FIG. 5, and eight sheets of documents are set in the feeding device.

In this modification, since steps S1201 to S1207 are similar to those in the above exemplary embodiment, descriptions thereof are omitted. Furthermore, when step S1207 is completed, the scanner 222 has completed reading eight sheets, and the processing-status-information storage unit 303 stores processing status information of "8" set in association with the device 140 indicated by D101.

After step S1207, the cancellation-condition determining section 801 determines whether the processing status information stored in the processing-status-information storage unit 303 is larger than the cancellation condition information contained in the job information in step S1301. Specifically, in the above example, the processing-status-information storage unit 303 stores the processing status information of "8" set in association with D101, and the job-information storage unit 305 stores the cancellation condition information of "5" set in association with D101. Therefore, the cancellation-condition determining section 801 determines that the processing status information stored in the processing-status-information storage unit 303 is larger than the cancellation condition information contained in the job information. When the cancellation-condition determining section 801 determines that the processing status information is larger than the cancellation condition information, the process proceeds to step S1302. If the cancellation-condition determining section 801 determines that the processing status information is not larger than the cancellation condition information, the process proceeds to step S1305. Specifically, since the cancellation-condition determining section 801 determines that the processing status information is larger than the cancellation condition information in the above specific example, the process proceeds to step S1302.

Then, the processing-status notifying section 902 provides a notification of the processing status information of the device 140 in association with the job number stored in the job-information storage unit 305 to the information processing apparatus 110 of the user indicated by the corresponding user ID. Specifically, in the above example, the processing-status notifying section 902 provides a notification regarding the processing status information of "8" and that the device 140 has interrupted the processing to the information processing apparatus 110 of the user having the user ID U101 contained in the job information.

Subsequently, in step S1303, the job-information acquiring unit 304 acquires job information set in association with a job number from the information processing apparatus 110. Specifically, for example, it is assumed that the job-information acquiring unit 304 acquires the job information containing the user ID U101, the device ID D101, the commanded processing information of "S", and the cancellation condition information of "8" set in association with the job number "1". In this case, in step S1304, the commanding unit 309 commands the device 140 to execute processing indicated by the commanded processing information based on the job information. Specifically, in the above example, the commanding unit 309 commands the scanner 222 to execute scanning, and the process proceeds to step S1207.

Then, in step S1207, the cancellation-condition determining section 801 determines whether the processing status information stored in the processing-status-information storage unit 303 is smaller than the cancellation condition information contained in the job information. Specifically, in the above example, since the cancellation condition information contained in the job information with the job number "1" is "8" and the processing status information set in association with the device ID D101 is "8", the cancellation-condition determining section 801 determines that the processing status information is not smaller than the cancellation condition information, and the process proceeds to step S1301.

Subsequently, in step S1301, the cancellation-condition determining section 801 determines whether the processing status information stored in the processing-status-information storage unit 303 is larger than the cancellation condition information contained in the job information. Specifically, in the above example, the cancellation-condition determining section 801 determines that the processing status information stored in the processing-status-information storage unit 303 is not larger than the cancellation condition information contained in the job information.

Then, in step S1305, the commanding unit 309 commands the device 140 to cancel the processing indicated by the commanded processing information. In step S1306, the data transmission commanding section commands the device 140 to transmit data based on the cancellation condition information contained in the job information. In the above specific example, the data transmission commanding section commands the device 140 to transmit read data of eight scanned documents sheets based on the cancellation condition information of "8" set in association with the job number "1". Since the subsequent flow is similar to that in the above exemplary embodiment, a description thereof is omitted.

In the above description, the job-information acquiring unit 304 acquires job information set in association with a job number from the information processing apparatus 110 in step S1303. On the other hand, if the job-information acquiring unit 304 does not acquire job information set in association with a job number from the information processing apparatus 110 in step S1303, the commanding unit 309 commands the device 140 to cancel the processing indicated by the commanded processing information in step S1305. Then, in step S1306, the data transmission commanding section commands the device 140 to transmit data based on the cancellation condition information contained in the job information.

If the job-information storage unit 305 stores job information after the job-information updating section 1002 updates the job information in step S1308, the information processing apparatus 110 executes a job based on the job information stored in the job-information storage unit 305. Therefore, the time period from step S1309 in which a job is completed to step S1202 in which another job is executed is not necessary.

Specifically, in the above example, of the read data of eight scanned document sheets, the data transmission commanding section commands the device 140 to transmit the read data of the first five scanned document sheets based on the cancellation condition information of "5" set in association with the job number "1". Therefore, even though the scanner 222 reads data from eight sheets of documents, the data acquiring section acquires the read data of the first five scanned document sheets. Since the subsequent flow is similar to that in the above exemplary embodiment, a description thereof is omitted.

According to the above exemplary embodiment, after one job has been completed, the time it takes to commence another job is not necessary, and the job ends if a predetermined cancellation condition is satisfied. Therefore, the time period in which a device is in an occupied state due to a job may be shortened, as compared with the related art.

The present invention is not limited to the above exemplary embodiment, and various modifications are possible. For example, the configuration described in the above exemplary embodiment may be replaced with a configuration substantially similar thereto, a configuration that exhibits a similar effect, or a configuration that achieves a similar purpose. Specifically, for example, the configuration and the flow of the management apparatus 120 are only examples and are not limited thereto. Moreover, although the device 140 is described as being a scanner 222 in the above description, the device 140 may alternatively be a copier that prints read data obtained by scanning, an image processing device that performs image processing on read data obtained by scanning, and so on.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
a device-information acquiring unit that acquires device identification information for identifying a device designated by a user from a plurality of devices;
a processing-status-information acquiring unit that acquires processing status information indicating a status of processing of each device;
a commanded-processing-information acquiring unit that acquires commanded processing information related to a content of processing to be commanded to the designated device;
a commanding unit that gives a command to the designated device based on the commanded processing information so as to set the designated device in an occupied state in which the designated device performs the processing in an occupied manner;
a cancellation-condition-information acquiring unit that acquires cancellation condition information indicating a cancellation condition for cancelling the occupied state; and
a cancellation-condition determining unit that determines whether the processing status information acquired by the processing-status-information acquiring unit satisfies the cancellation condition acquired by the cancellation-condition-information acquiring unit,
wherein the commanding unit further gives a command for cancelling the occupied state of the designated device in accordance with a determination result obtained by the cancellation-condition determining unit,
wherein the cancellation condition comprises a threshold number of sheets.

2. The management apparatus according to claim 1, further comprising:
a communication unit that establishes communication between the management apparatus and the designated device if the commanding unit transmits the commanded processing information to the designated device and gives a command thereto, and that cancels the established communication between the management apparatus and the designated device if the commanding unit gives the command for cancelling the occupied state of the designated device.

3. The management apparatus according to claim 1, wherein if the commanded-processing-information acquiring unit acquires first commanded processing information related to a content of processing to be commanded to the designated device and subsequently acquires second commanded processing information related to a content of processing to be commanded to the designated device, the commanding unit gives a command to the designated device based on the second commanded processing information after the occupied state of the designated device based on the first commanded processing information is cancelled.

4. The management apparatus according to claim 1, further comprising:
an occupancy-information acquiring unit that acquires occupancy information set in association with the device identification information acquired by the device-information acquiring unit, the occupancy information indicating whether the device indicated by the device identification information is in the occupied state or an unoccupied state that is different from the occupied state.

5. The management apparatus according to claim 4, further comprising:
an occupied-state display that displays whether the designated device is in the occupied state or the unoccupied state.

6. The management apparatus according to claim 1, further comprising:
a processing-status-information notifying unit that provides a notification of the processing status information in accordance with the determination result obtained by the cancellation-condition determining unit.

7. The management apparatus according to claim 6,
wherein the cancellation-condition-information acquiring unit further acquires updated cancellation condition information, which is different from the cancellation condition information, based on the notification provided by the processing-status-information notifying unit, and
wherein the cancellation-condition determining unit determines whether the processing status information acquired by the processing-status-information acquiring unit satisfies the updated cancellation condition information acquired by the cancellation-condition-information acquiring unit.

8. The management apparatus according to claim 1,
wherein the device-information acquiring unit, the commanded-processing-information acquiring unit, and the cancellation-condition-information acquiring unit respectively acquire the device identification information of the designated device, the commanded processing information, and the cancellation condition information that are set in association with each other.

9. The management apparatus according to claim 1, further comprising:
a user-identification acquiring unit that acquires user identification information for identifying the user.

10. The management apparatus according to claim 1, wherein the device includes a data acquiring unit that acquires data expressed on a surface of a medium.

11. The management apparatus according to claim 1, wherein the commanding unit gives the command via a distribution unit that controls a connection between the management apparatus and the plurality of devices.

12. An information processing apparatus comprising:
a device-information acquiring unit that acquires device identification information for identifying a device designated by a user from a plurality of devices;
a processing-status-information acquiring unit that acquires processing status information indicating a status of processing of each device;
a commanded-processing-information acquiring unit that acquires commanded processing information related to a content of processing to be commanded to the designated device;
a commanding unit that gives a command to the designated device based on the commanded processing information so as to set the designated device in an occupied state in which the designated device performs the processing in an occupied manner;

a cancellation-condition-information acquiring unit that acquires cancellation condition information indicating a cancellation condition for cancelling the occupied state; and a cancellation-condition determining unit that determines whether the processing status information acquired by the processing-status-information acquiring unit satisfies the cancellation condition acquired by the cancellation-condition-information acquiring unit, wherein the commanding unit further gives a command for cancelling the occupied state of the designated device in accordance with a determination result obtained by the cancellation-condition determining unit, wherein the cancellation condition comprises a threshold number of sheets.

13. The information processing apparatus according to claim 12, wherein the commanding unit gives the command via a distribution unit that controls a connection between the management apparatus and the plurality of devices.

14. A distribution apparatus comprising:

a device-information acquiring unit that acquires device identification information for identifying a device designated by a user from a plurality of devices;

a processing-status-information acquiring unit that acquires processing status information indicating a status of processing of each device;

a commanded-processing-information acquiring unit that acquires commanded processing information related to a content of processing to be commanded to the designated device;

a commanding unit that gives a command to the designated device based on the commanded processing information so as to set the designated device in an occupied state in which the designated device performs the processing in an occupied manner;

a cancellation-condition-information acquiring unit that acquires cancellation condition information indicating a cancellation condition for cancelling the occupied state; and a cancellation-condition determining unit that determines whether the processing status information acquired by the processing-status-information acquiring unit satisfies the cancellation condition acquired by the cancellation-condition-information acquiring unit, wherein the commanding unit further gives a command for cancelling the occupied state of the designated device in accordance with a determination result obtained by the cancellation-condition determining unit, wherein the cancellation condition comprises a threshold number of sheets.

15. The distribution apparatus according to claim 14, wherein the commanding unit gives the command via a distribution unit that controls a connection between the management apparatus and the plurality of devices.

16. A management system comprising:

a plurality of devices;

a management apparatus;

a device-information acquiring unit that acquires device identification information for identifying a device designated by a user from the plurality of devices;

a processing-status-information acquiring unit that acquires processing status information indicating a status of processing of each device;

a commanded-processing-information acquiring unit that acquires commanded processing information related to a content of processing to be commanded to the designated device;

a commanding unit that gives a command to the designated device based on the commanded processing information so as to set the designated device in an occupied state in which the designated device performs the processing in an occupied manner;

a cancellation-condition-information acquiring unit that acquires cancellation condition information indicating a cancellation condition for cancelling the occupied state;

a cancellation-condition determining unit that determines whether the processing status information acquired by the processing-status-information acquiring unit satisfies the cancellation condition acquired by the cancellation-condition-information acquiring unit; and a controller that controls the designated device of the plurality of devices in accordance with the command, wherein the commanding unit further gives a command for cancelling the occupied state of the designated device in accordance with a determination result obtained by the cancellation-condition determining unit, wherein the cancellation condition comprises a threshold number of sheets.

17. A non-transitory computer readable medium storing a program causing a computer to execute a management process, the process comprising:

acquiring device identification information for identifying a device designated by a user from a plurality of devices;

acquiring processing status information indicating a status of processing of each device;

acquiring commanded processing information related to a content of processing to be commanded to the designated device;

giving a command to the designated device based on the commanded processing information so as to set the designated device in an occupied state in which the designated device performs the processing in an occupied manner;

acquiring cancellation condition information indicating a cancellation condition for cancelling the occupied state; and determining whether the acquired processing status information satisfies the acquired cancellation condition, wherein the giving the command further includes giving a command for cancelling the occupied state of the designated device in accordance with a determination result obtained by the determining, wherein the cancellation condition comprises a threshold number of sheets.

18. A management method comprising:

acquiring device identification information for identifying a device designated by a user from a plurality of devices;

acquiring processing status information indicating a status of processing of each device;

acquiring commanded processing information related to a content of processing to be commanded to the designated device;

giving a command to the designated device based on the commanded processing information so as to set the designated device in an occupied state in which the designated device performs the processing in an occupied manner;

acquiring cancellation condition information indicating a cancellation condition for cancelling the occupied state; and determining whether the acquired processing status information satisfies the acquired cancellation condition, wherein the giving the command further includes giving a command for cancelling the occupied state of the designated device in accordance with a determination result obtained by the determining, wherein the cancellation condition comprises a threshold number of sheets.

* * * * *